United States Patent
Chen et al.

(10) Patent No.: US 11,893,414 B2
(45) Date of Patent: Feb. 6, 2024

(54) OPERATION METHOD, DEVICE AND RELATED PRODUCTS

(71) Applicant: Cambricon Technologies Corporation Limited, Beijing (CN)

(72) Inventors: Xi Chen, Beijing (CN); Jin Wang, Beijing (CN); Shijin Zhang, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 744 days.

(21) Appl. No.: 16/711,370

(22) Filed: Dec. 11, 2019

(65) Prior Publication Data
US 2020/0210233 A1    Jul. 2, 2020

(30) Foreign Application Priority Data

Dec. 29, 2018  (CN) .................. 201811635181.X

(51) Int. Cl.
*G06F 9/48*   (2006.01)
*G06N 3/08*   (2023.01)
(Continued)

(52) U.S. Cl.
CPC ............ *G06F 9/4881* (2013.01); *G06F 15/80* (2013.01); *G06N 3/08* (2013.01); *G06Q 50/265* (2013.01)

(58) Field of Classification Search
None
See application file for complete search history.

(56) References Cited

U.S. PATENT DOCUMENTS

| 10,891,156 B1 * | 1/2021 | Zhao ................. G06F 9/4881 |
| 2011/0066578 A1 | 3/2011 | Chong et al. |

(Continued)

FOREIGN PATENT DOCUMENTS

| CN | 103049245 A | 4/2013 |
| CN | 103729235 A | 4/2014 |

(Continued)

OTHER PUBLICATIONS

Jia, Zhihao, Matei Zaharia, and Alex Aiken. "Beyond Data and Model Parallelism for Deep Neural Networks." Proceedings of Machine Learning and Systems 1 (2019): 1-13.*

(Continued)

*Primary Examiner* — Mohamed A. Wasel
*Assistant Examiner* — Gregory P Tolchinsky
(74) *Attorney, Agent, or Firm* — Getech Law LLC; Jun Ye

(57) ABSTRACT

The invention relates to an operation method and device and a related product, the product comprises a control module, and the control module comprises an instruction caching unit, an instruction processing unit and a storage queue unit; the instruction caching unit is used for storing a calculation instruction associated with the artificial neural network operation; the instruction processing unit is used for analyzing the calculation instruction to obtain a plurality of operation instructions; the storage queue unit is used for storing instruction queues, and the instruction queues comprise a plurality of operation instructions or calculation instructions to be executed according to the sequence of the queues. Through the method, the operation efficiency of related products during operation of the neural network model can be improved.

6 Claims, 9 Drawing Sheets

(51) Int. Cl.
    *G06F 15/80*     (2006.01)
    *G06Q 50/26*     (2012.01)

(56) References Cited

U.S. PATENT DOCUMENTS

| | | |
|---|---|---|
| 2018/0052709 A1 | 2/2018 | Fong et al. |
| 2018/0075347 A1* | 3/2018 | Alistarh ................. G06N 3/084 |
| 2018/0314935 A1* | 11/2018 | Lewis .................... G06N 3/063 |
| 2019/0318240 A1* | 10/2019 | Kulkarni .................. G06N 3/08 |
| 2021/0374530 A1* | 12/2021 | Mahkonen ............... G06N 3/10 |

FOREIGN PATENT DOCUMENTS

| | | |
|---|---|---|
| CN | 104036451 A | 9/2014 |
| CN | 104714852 A | 6/2015 |
| CN | 105243107 A | 1/2016 |
| CN | 105787865 A | 7/2016 |
| CN | 106095588 A | 11/2016 |
| CN | 106648546 A | 5/2017 |
| CN | 106663224 A | 5/2017 |
| CN | 107122375 A | 9/2017 |
| CN | 107315632 A | 11/2017 |
| CN | 107480115 A | 12/2017 |
| CN | 107480717 A | 12/2017 |
| CN | 107844833 A | 3/2018 |
| CN | 107862378 A | 3/2018 |
| CN | 107992299 A | 5/2018 |
| CN | 108681777 A | 10/2018 |
| CN | 109002350 A | 12/2018 |

OTHER PUBLICATIONS

201811635181.X—Office Action, dated Aug. 28, 2019, 9 pages. (no English translation).
CN201811635181—Notice of Grant, dated Oct. 14, 2019, 4 pages.
CN201910917696—First Office Action, dated Aug. 21, 2020, 12 pages.
CN201910917696—Notice of Grant, dated Dec. 25, 2020, 04 pages.

* cited by examiner

OPERATION METHOD, DEVICE AND RELATED PRODUCTS

TECHNICAL FIELD

The present disclosure relates to the field of information processing technology, and particularly relates to an operation method, a device, and related products.

BACKGROUND

With the development of the artificial intelligence industry, an increasing number of deep learning frameworks are redeveloped and used. In order to accelerate the computation of artificial intelligence applications, artificial intelligence processors have appeared, which include applications in the cloud and end levels according to application scenarios. Cloud-based applications for servers often use multi-core artificial intelligence processors to achieve higher computing power. Therefore, the efficient use of multiple cores within artificial intelligence processors plays an important role in achieving the performance of artificial intelligence processors.

SUMMARY

In view of this, the present disclosure provides a parallel execution method and a device. By passing a parallel degree parameter through a command line, a degree of model parallelism and a degree of data parallelism of a second processor may be adjusted and set according to a requirement for throughput and latency of a task to be processed, so as to achieve the best balance between high throughput and low latency, which have strong universality.

According to an aspect of the present disclosure, a parallel execution method is provided, where the method is applied to a first processor, and includes:
receiving a first command and obtaining a parallel degree parameter in the first command; and
setting a degree of parallelism of a second processor according to the parallel degree parameter, so that multiple cores in the second processor can perform a task to be processed by using the degree of parallelism,
where the parallel degree parameter includes a model parallel parameter and a data parallel parameter, and the degree of parallelism includes a degree of model parallelism and a degree of data parallelism.

In an example, the task to be processed includes an online task, where the setting the degree of parallelism of the second processor according to the parallel degree parameter includes:
setting the degree of model parallelism in a first configuration file of the task to be processed according to the model parallel parameter; and
setting a degree of data parallelism in a second configuration file of the task to be processed according to the data parallel parameter,
where the first configuration file and the second configuration file are stored in the first processor.

In an example, the setting the degree of parallelism of the second processor according to the parallel degree parameter so as to make the multiple cores in the second processor perform the task to be processed by using the degree of parallelism further includes:
compiling the online task according to the degree of model parallelism in the first configuration file, and generating a program to be executed on the second processor; and
transferring the degree of data parallelism in the second configuration file to the second processor through a second command, so that the second processor can obtain data according to the degree of data parallelism and execute the program to be executed to process the data.

In an example, the task to be processed includes an offline task, wherein the setting the degree of parallelism of the second processor according to the parallel degree parameter so as to make the multiple cores in the second processor perform the task to be processed by using the degree of parallelism further includes:
determining the degree of model parallelism and the degree of data parallelism according to the model parallel parameter and the data parallel parameter respectively;
compiling the offline task according to the degree of model parallelism to generate an offline file; and
transferring data and the degree of data parallelism in the offline file to the second processor by using a third command, so that the second processor can acquire data according to the degree of data parallelism and execute the program to be executed in the offline file to process the data.

In an example, the first processor is a general purpose processor, and the second processor is an artificial intelligence processor.

According to another aspect of the present disclosure, a computer device is provided, which includes a memory and a processor, where the memory stores a computer program which is executable on the processor, and the processor implements steps in the above methods when executing the computer program.

According to another aspect of the present disclosure, a readable storage medium is provided, on which a computer program is store, where the computer program implements steps in the above methods when executed by the processor According to another aspect of the present disclosure, a parallel execution method is provided, where the method is applied to a second processor, and includes:
receiving a program to be executed and a data parallel parameter from a first processor, where the data parallel parameter includes a degree of data parallelism;
obtaining data according to the degree of data parallelism, where the data is input data of the program to be executed; and
executing the program to be executed to process the data.

In an example, the receiving the data parallel parameter from the first processor includes:
receiving a fourth command sent by the first processor, where the fourth command carries a data parallel parameter.

In an example, the first processor is a general purpose processor, and the second processor is an artificial intelligence processor.

According to another aspect of the present disclosure, a computer device is provided, which includes a memory and a processor, where the memory stores a computer program which is executable on the processor, and the processor implements steps in the above methods when executing the computer program.

According to another aspect of the present disclosure, a readable storage medium is provided, on which a computer program is stored, where the computer program implements steps in the above methods when executed by the processor.

According to an aspect of the present disclosure, a parallel execution device is provided, where the device is applied to a first processor, and includes:
- an obtaining module configured to receive a first command and obtain a parallel degree parameter in the first command; and
- a setting module configured to set a degree of parallelism of a second processor according to the parallel degree parameter, so that multiple cores in the second processor can execute a task to be processed by using the degree of parallelism,
- where the parallel degree parameter includes a model parallel parameter and a data parallel parameter, and the degree of parallelism includes a degree of model parallelism and a degree of data parallelism.

In an example, the task to be processed includes an online task, and the setting module includes:
- a first setting unit configured to set a degree of model parallelism in a first configuration file of the task to be processed according to the model parallel parameter; and
- a second setting unit configured to set a degree of data parallelism in a second configuration file of the task to be processed according to the data parallel parameter,
- where the first configuration file and the second configuration file are stored in the first processor.

In an example, the setting module further includes:
- a first compiling unit configured to compile the online task according to a degree of model parallelism in the first configuration file, and generate a program to be executed on a second processor; and
- a first sending unit configured to send the degree of data parallelism in the second configuration file to the second processor through a second command, so that the second processor can obtain data according to the degree of data parallelism and execute the program to be executed to process the data.

In an example, the task to be processed includes an offline task, and the setting module further includes:
- a determining unit configured to determine the degree of model parallelism and the degree of data parallelism according to the model parallel parameter and the data parallel parameter respectively;
- a second compiling unit configured to compile the offline task according to the degree of model parallelism, and generate an offline file; and a second sending unit configured to send data and a degree of data parallelism in the offline file to the second processor through a third command, so that the second processor can obtain data according to the degree of data parallelism and execute the program to be executed in the offline file to process the data.

In an example, the first processor is a general purpose processor, and the second processor is an artificial intelligence processor.

According to another aspect of the present disclosure, a parallel execution device is provided, where the device is applied to a second processor, and includes:
- a control module configured to receive, from a first processor, a program to be executed and a data parallel parameter, where the data parallel parameter includes a degree of data parallelism.

The control module is further configured to obtain data according to the degree of data parallelism, where the data is input data of the program to be executed.

The device further includes an operation module configured to execute the program to be executed to process the data.

In an example, the control module includes:
- a receiving unit configured to receive a fourth command sent by the first processor, where the fourth command carries the data parallel parameter.

In an example, the first processor is a general purpose processor, and the second processor is an artificial intelligence processor.

According to another aspect of the present disclosure, an artificial intelligence processing device is provided, which includes a first processor and a second processor. The first processor is connected to the second processor.

The first processor is configured to execute the method executed by the above first processor, and the second processor is configured to execute the method executed by the above second processor.

In an example, the second processor is configured to perform an artificial intelligence computation, and includes: an operation module and a control module. The operation module includes: a primary processing circuit and multiple secondary processing circuits.

The control module is configured to receive a program to be executed and a data parallel parameter from the first processor, where the data parallel parameter includes a degree of data parallelism, and the program to be executed includes a computing instruction.

The control module is further configured to obtain data according to the degree of data parallelism, where the data is input data of the program to be executed.

The control module is further configured to parse the computing instruction to obtain multiple operating instructions, and send the multiple operating instructions and the input data to the primary processing circuit.

The primary processing circuit is configured to perform pre-processing on the input data and transfer data and operating instructions among the multiple secondary processing circuits.

The multiple secondary processing circuits are configured to perform intermediate operations in parallel according to data transferred from the primary processing circuit and operating instructions to obtain multiple intermediate results, and transfer the multiple intermediate results to the primary processing circuit.

The primary processing circuit is configured to perform subsequent processing on the multiple intermediate results to obtain a computing result of the computing instruction.

According to another aspect of the present disclosure, a combined processing device is provided, where the combined processing device includes the artificial intelligence processing device, a universal interconnection interface, and other processing devices;
- where the artificial intelligence processing device interacts with the other processing devices to jointly complete a computing operation designated by users.

In an example, the combined processing device further includes: a storage device, where the storage device is connected to the artificial intelligence processing device and the other processing devices respectively, and is configured to store data of the artificial intelligence processing device and the other processing devices.

By passing a parallel degree parameter through a command line, a degree of model parallelism and a degree of data parallelism of a second processor may be adjusted and set according to a requirement for throughput and latency of a task to be processed, so as to achieve a best balance between high throughput and low latency. For different models, it is easy to reach user-desired best balance between throughput and latency. Therefore, the parallel execution method and device have strong universality and flexibility. Moreover, computing power of multiple cores in the second processor can be effectively used.

Other features and aspects of the present disclosure will be apparent according to the following detailed description of examples with reference to accompanied drawings.

BRIEF DESCRIPTION OF THE DRAWINGS

The accompanying drawings contained in the specification, together with the specification, illustrate exemplary examples, features, and aspects of the present disclosure, and are used to explain principles of the present disclosure.

DETAILED DESCRIPTION OF EXAMPLES

Various exemplary examples, features, and aspects of the present disclosure will be described in detail below with reference to the accompanied drawings. Identical markers in the accompanied drawings represent elements with identical or similar functions. Although various aspects of the examples are shown in the accompanied drawings, the accompanied drawings are not necessarily drawn in proportion unless specifically stated.

The word "exemplary" as used herein means "used as an example, example, or illustration." Any example described herein as "exemplary" is not necessarily to be interpreted as superior to or better than other examples.

In addition, in order to better illustrate the present disclosure, various specific details are given in the detailed description of examples below. Those skilled in the art should understand that the present disclosure can be implemented without certain specific details. In some examples, methods, means, elements, and circuits known to those skilled in the art are not described in detail in order to highlight the gist of the present disclosure.

Parallelization of artificial intelligence models (hereinafter referred to as models) comprises data parallelism and model parallelism. In data parallelism, different cores contain multiple copies of a same model, different data is assigned to each core, and computation results of all cores are merged in a certain way, which can increase an amount of data such as pictures read by a network at a single time. In model parallelism, different cores in a distributed system are responsible for different parts of an artificial intelligence model. For instance, different network layers of an artificial intelligence model are assigned to different cores, or different parameters within the same layer are assigned to different cores. In other words, characteristics such as operators in the model are split to run on different cores.

High throughput and low latency are two goals of multi-core performance improvement. For specific applications, requirements for latency and throughput are different. In order to solve this technical problem, the present disclosure provides a parallel execution method and related devices.

In an example, the parallel execution method and devices mentioned below in the present disclosure may be developed based on caffe (Convolutional Architecture for Fast Feature Embedding, a convolutional neural network framework). The present disclosure is not limited hereto. A multi-core parallel execution method can also be developed based on other machine learning frameworks according to actual needs to improve efficiency of an artificial intelligence processor.

Figure 1:
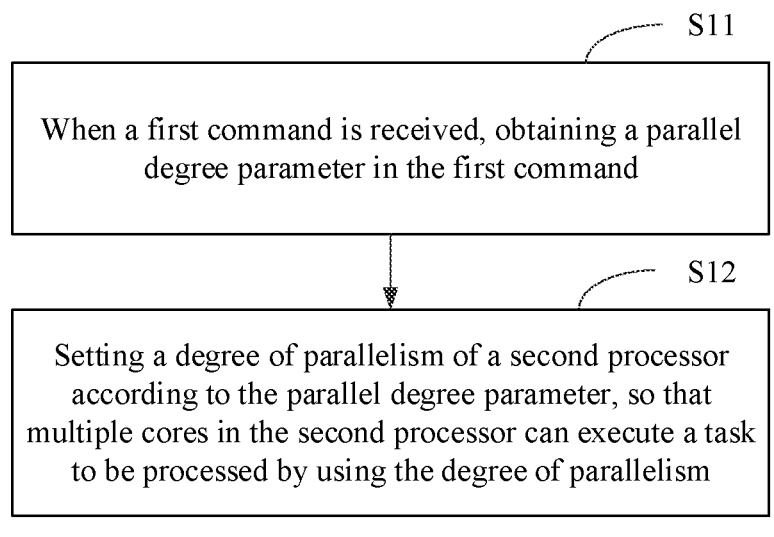
FIG. 1 is a flowchart of a parallel execution method according to an example of the present disclosure.

FIG. 1 shows a flowchart of a parallel execution method according to an example of the present disclosure. This method can be applied to a first processor. The first processor may be a primary processor, and may be a general-purpose processor such as a central processing unit (CPU), a graphics processing unit (GPU), and the like. A specific type of the first processor is not limited in the present disclosure. The first processor may be a processor on a terminal, where the terminal may further include a memory, an input device, etc., or may be a computer, etc., which is not limited in the present disclosure.

On the first processor, a multi-core parallel execution method and device can be developed based on caffe. As shown in FIG. 1, the method may include:

a step S11: when a first command is received, obtaining a parallel degree parameter in the first command; and a step S12: setting a degree of parallelism of a second processor according to the parallel degree parameter, so that multiple cores in the second processor can execute a task to be processed by using the degree of parallelism, where the parallel degree parameter includes a model parallel parameter and a data parallel parameter, and the degree of parallelism includes a degree of model parallelism and a degree of data parallelism.

By passing a parallel degree parameter through a command line, a degree of model parallelism and a degree of data parallelism of a second processor may be adjusted and set according to a requirement for throughput and latency of a task to be processed, so as to achieve a best balance between high throughput and low latency. For different models, it is easy to reach user-desired best balance between throughput and latency. Therefore, the parallel execution method and device have strong universality and flexibility. Moreover, computing power of multiple cores in the second processor can be effectively used.

In addition, the universality of the setting method enables decoupling from the users' application scenarios, so as to facilitate users to protect core data from being leaked.

For flexibility, for instance, if an application requires low latency, the degree of model parallelism can be increased moderately. If an application requires large throughput, the degree of data parallelism can be increased moderately. Both the degree of model parallelism and the degree of data parallelism can be directly set by passing a parameter through a command line, which is flexible and easy.

For the step S11, the first command may be a configuration command for configuring the degree parallel parameter, or may be a command line input by users through an input device of a terminal. The command line includes the parallel degree parameter, and the parallel parameter may include the model parallel parameter (mp, model parallelism) and the data parallel parameter (dp, data parallelism). When the first processor receives the first command, the model parallel parameter mp and the data parallel parameter dp can be obtained.

For the step S12, the task to be processed may be a model to be trained. The task to be processed may include an online task, where the online task may refer to that the first processor needs to compile and execute a program on the second processor through an online program.

The second processor may be an artificial intelligence processor for performing an artificial intelligence operation, and may include multiple cores. The artificial intelligence processor may include one or more of Majority Logic Unit (MLU), Neural-Network Processing Unit (NPU), Digital Signal Process (DSP), and Field-Programmable Array Gate Array (FPGA) chip. A specific type of the second processor is not limited in the present disclosure.

For an online task, the setting the degree of parallelism of the second processor according to the parallelism parameter in the step S12 may include:
   setting a degree of model parallelism in a first configuration file of the task to be processed according to the model parallel parameter; and
   setting the data parallelism in a second configuration file of the task to be processed according to the data parallelism parameter.

The first configuration file and the second configuration file may be files stored in the first processor, and may be configuration files for configuring caffe. Corresponding functions may be included in the first configuration file and the second configuration file as interfaces. After receiving the first command, the first processor may call a first function in the first configuration file to set the degree of model parallelism according to the model parallel parameter, and call a second function in the second configuration file to set the degree of data parallelism according to the data parallel parameter. The first function and the second function may be functions developed based on caffe for configuring the parallel degree parameter.

It should be noted that file names and storage locations of the first configuration file and the second configuration file can be set according to actual application requirements, which are not limited in the present disclosure. Similarly, the first function and the second function can also be selected according to actual application scenarios, which are not limited in the present disclosure.

The degree of model parallelism set in the first configuration file and the degree of data parallelism set in the second configuration file can be used as global variables of a thread corresponding to the task to be processed, and are applicable to an entire life cycle of the thread.

Figure 2:
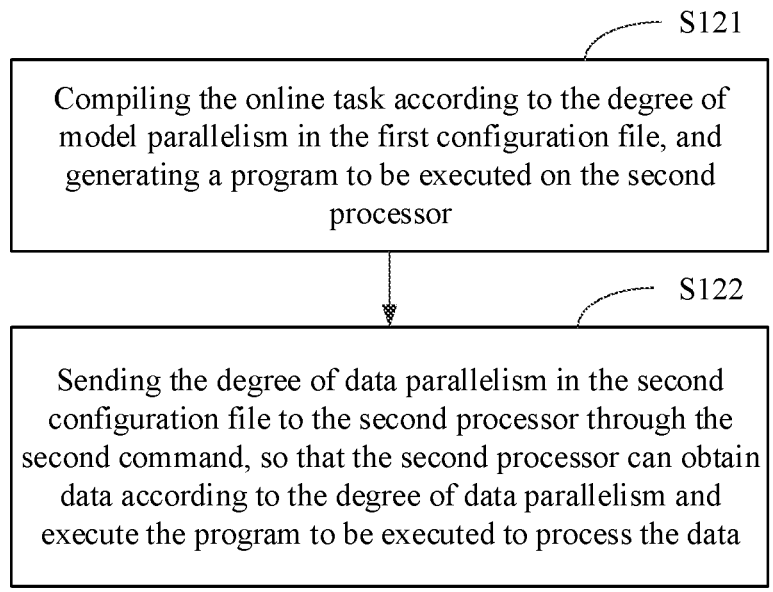
FIG. 2 is a flowchart of a method of a step S12 according to an example of the present disclosure.

FIG. 2 shows a flowchart of a method of the step S12 according to an example of the present disclosure. As shown in FIG. 2, the step S12 may further include:
   a step S121: compiling the online task according to the degree of model parallelism in the first configuration file, and generating a program to be executed on the second processor; and
   a step S122: sending the degree of data parallelism in the second configuration file to the second processor through the second command, so that the second processor can obtain data according to the degree of data parallelism and execute the program to be executed to process the data.

Model parallelism is mainly implemented during compilation. Therefore, the first processor may compile an online task according to the degree of model parallelism set in the first configuration file, and generate a program to be executed on the second processor. During compilation, the model in the online task is divided into different parts (such as different network layers) according to the degree of model parallelism for compilation, and a program to be executed is generated on the core of the second processor corresponding to the part. In an example, the first processor may call the first function (interface) in the first configuration file to obtain the degree of model parallelism. The second command may be a command line in a thread corresponding to the online task. The first processor may call the second function (interface) of the second configuration file to obtain the degree of data parallelism, and pass the degree of data parallelism into the second processor through a command line.

The second processor may obtain data according to the degree of data parallelism. The data, such as pictures and sounds, may need to be processed in online tasks. For instance, by setting the degree of data parallelism, a number of pictures obtained by the second processor at a time can be set. Multiple copies of the same model may be included in multiple different cores of the second processor, and the number of multiple copies may be the same as the degree of data parallelism. Therefore, the multiple cores on the second processor may simultaneously process obtained multiple pictures to achieve data parallelism.

For an online task, the degree of model parallelism and the degree of data parallelism of the second processor can be set through the above process. For different models, it is easy to reach user-desired best balance between throughput and latency, which has strong flexibility. Moreover, computing power of multiple cores in the second processor can be effectively used.

In an example, the task to be processed may further include an offline task. For the offline task, the processes of compilation and running are separated.

Figure 3:
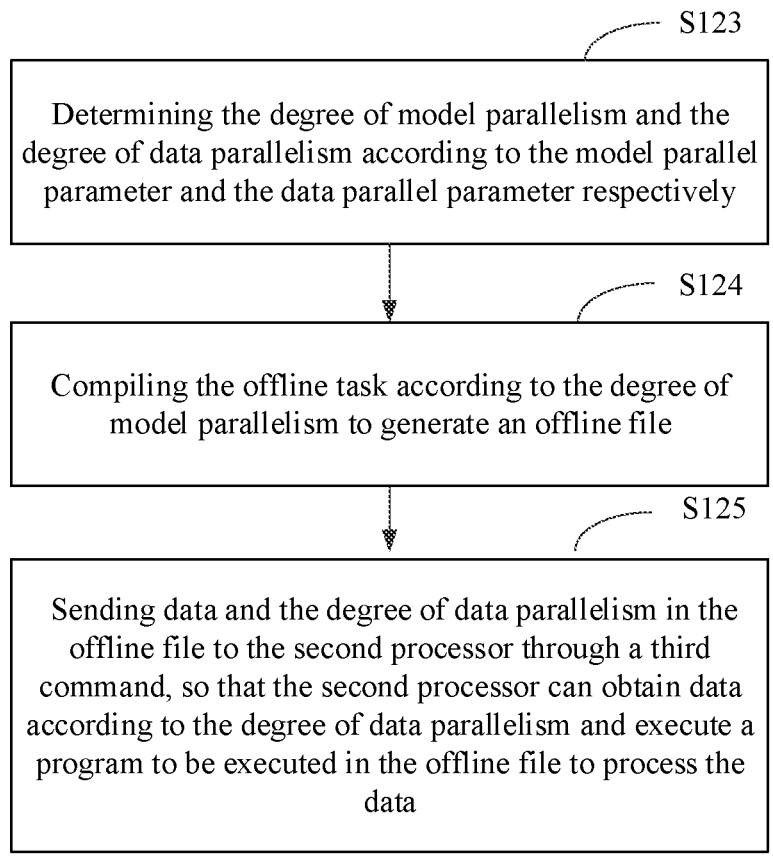
FIG. 3 shows a flowchart of the method of the step S12 according to an example of the present disclosure.

FIG. 3 shows a flowchart of a method of the step S12 according to an example of the present disclosure. For an offline task, the step S12 may include:
   a step S123: determining the degree of model parallelism and the degree of data parallelism according to the model parallel parameter and the data parallel parameter respectively;
   a step S124: compiling the offline task according to the degree of model parallelism to generate an offline file; and
   a step S125: sending data and the degree of data parallelism in the offline file to the second processor through a third command, so that the second processor can obtain data according to the degree of data parallelism and execute a program to be executed in the offline file to process the data.

In an example, the first processor may determine the degree of model parallelism according to the model parallel parameter in the first command, and determine the degree of data parallelism according to the data parallel parameter in the first command.

It should be noted that the processes of determining the degree of model parallelism and the degree of data parallelism may not be performed at the same time, which is not limited in this disclosure. In another example, the degree of model parallelism in a third configuration file may be set according to the model parallel parameter. The third configuration file may be a configuration file for the offline task, and the third configuration file may also be stored in the first processor. For instance, the third configuration file may be a configuration file for configuring the offline task of caffe.

The first processor may compile the offline task according to the determined degree of model parallelism to generate an offline file, or may call the interface of the third configuration file to obtain the degree of model parallelism, and compile the offline task according to the obtained degree of model parallelism to generate an offline file. Specifically, during the process of compilation, a model in the offline task may be split into different parts according to the degree of model parallelism for compilation to generate an offline file. Data in the offline file may include a program to be executed that needs to be executed by the second processor and related parameters, where the related parameters may be a weight of the model and the like.

The third command may be a command line in a thread corresponding to the offline task, and the first processor may transfer data and the degree of data parallelism in the offline file to the second processor through a command line. For processing procedures of the second processor, please refer to the above description. Details will not be further described herein.

For an offline task, the degree of model parallelism and the degree of data parallelism of the second processor can be set through the above process. For different models, it is easy to reach user-desired best balance between throughput and latency, which has strong flexibility. Moreover, computing power of multiple cores in the second processor can be effectively used.

Figure 4:
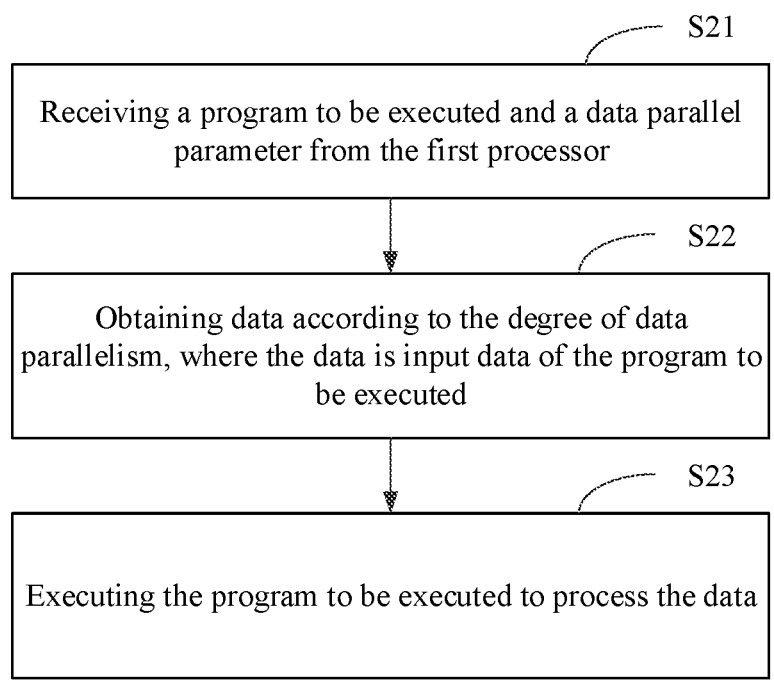
FIG. 4 is a flowchart of a parallel execution method according to an example of the present disclosure.

FIG. 4 shows a flowchart of a parallel execution method according to an example of the present disclosure. The method may be applied to the second processor. As described above, the second processor may be an artificial intelligence processor for performing an artificial intelligence operation, and may include multiple cores. The artificial intelligence processor may include one or more of Majority Logic Unit (MLU), Neural-Network Processing Unit (NPU), Digital Signal Process (DSP), and Field-Programmable Array Gate Array (FPGA) chip. A specific type of the second processor is not limited in the present disclosure.

As shown in FIG. 4, the method may include:
a step S21: receiving a program to be executed and a data parallel parameter from the first processor;
a step S22: obtaining data according to the degree of data parallelism, where the data is input data of the program to be executed; and
a step S23: executing the program to be executed to process the data.

For the step S21, receiving the program to be executed from the first processor may refer to receiving the program to be executed online or offline. For instance, for an online task, the first processor generates a program to be executed on the second processor during the process of compilation. Alternatively, for an offline task, the first processor generates an offline file after compilation, where the offline file includes a program to be executed and related parameters, and then data in the offline file is transferred to the second processor through a command line. During the process of compilation, the first processor may compile the task to be processed (online task or offline task) according to the degree of model parallelism.

Receiving the data parallel parameter from the first processor may include receiving a fourth command sent by the first processor, and the data parallel parameter is included in the fourth command. The fourth command may be the second command or the third command as described above. The data parallel parameter may be a degree of data parallelism.

For the step S22 and the step S23, please refer to the description of the step S122, and details will not be further described herein.

By passing a parallel degree parameter through a command line, a degree of model parallelism and a degree of data parallelism of the second processor may be adjusted and set according to a requirement for throughput and latency of a task to be processed, so as to achieve the best balance between high throughput and low latency. For different models, it is easy to reach user-desired best balance between throughput and latency. Therefore, the parallel execution method and device have strong universality and flexibility. Moreover, computing power of multiple cores in the second processor can be effectively used.

Figure 5:
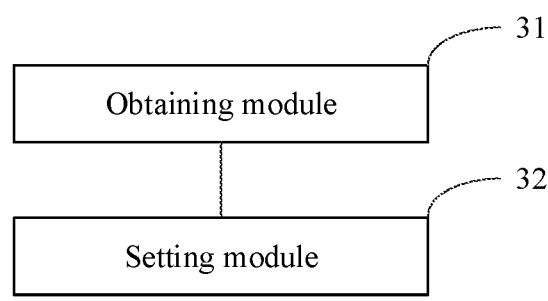
FIG. 5 is a block diagram of a parallel execution device according to an example of the present disclosure.

FIG. 5 is a block diagram of a parallel execution device according to an example of the present disclosure. The device may be applied to the first processor, and may include:
an obtaining module 31 configured to receive a first command and obtain a parallel degree parameter in the first command; and
a setting module 32 configured to set a degree of parallelism of the second processor according to the parallel degree parameter, so that multiple cores in the second processor can execute a task to be processed by using the degree of parallelism,
where, the parallel degree parameter includes a model parallel parameter and a data parallel parameter, and the degree of parallelism includes a degree of model parallelism and a degree of data parallelism.

By passing a parallel degree parameter through a command line, a degree of model parallelism and a degree of data parallelism of the second processor may be adjusted and set according to a requirement for throughput and latency of a task to be processed, so as to achieve the best balance between high throughput and low latency. For different models, it is easy to reach user-desired best balance between throughput and latency. Therefore, the parallel execution method and device have strong universality and flexibility. Moreover, computing power of multiple cores in the second processor can be effectively used.

Figure 6:
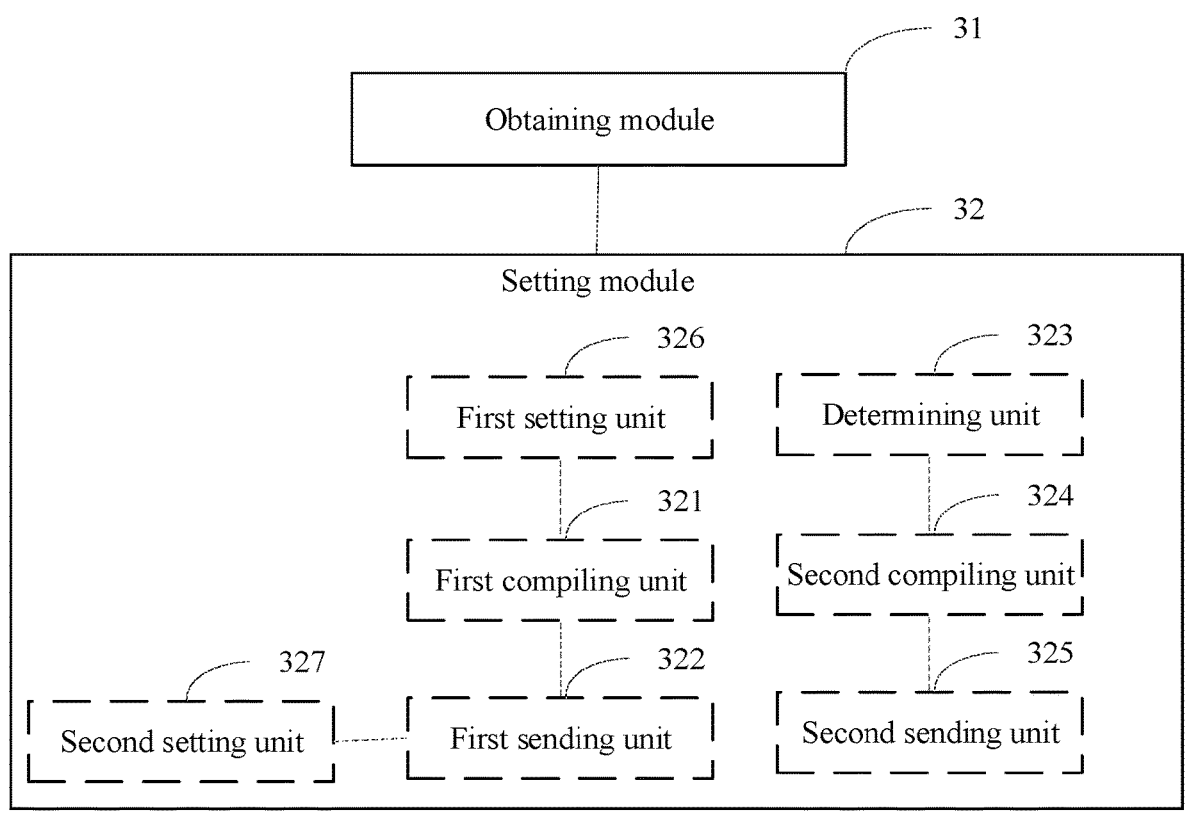
FIG. 6 is a block diagram of a parallel execution device according to an example of the present disclosure.

FIG. 6 is a block diagram of a parallel execution device according to an example of the present disclosure.

In an example, the task to be processed includes an online task. As shown in FIG. 6, the setting module 32 may include:
a first compiling unit 321 configured to compile the online task according to the degree of model parallelism in the first configuration file, and generate a program to be executed on the second processor; and
a first sending unit 322 configured to send the degree of data parallelism in the second configuration file to the second processor by using the second command, so that the second processor can obtain data according to the degree of data parallelism and execute a program to be executed to process the data.

In an example, the task to be processed includes an offline task. The setting module 32 further includes:
a determining unit 323 configured to determine the degree of model parallelism and the degree of data parallelism according to the model parallel parameter and the data parallel parameter respectively;

a second compiling unit 324 configured to compile the offline task according to the degree of model parallelism to generate an offline file; and a second sending unit 325 configured to send data and the degree of data parallelism in the offline file to the second processor through the third command, so that the second processor can obtain data according to the degree of data parallelism and execute the program to be executed to process the data.

In an example, the setting module 32 may further include:

a first setting unit 326 configured to set the degree of model parallelism in the first configuration file of the task to be processed according to the model parallel parameter; and a second setting unit 327 configured to set the degree of data parallelism in the second configuration file of the task to be processed according to the data parallel parameter, where, the first configuration file and the second configuration file are stored in the first processor.

Figure 7:
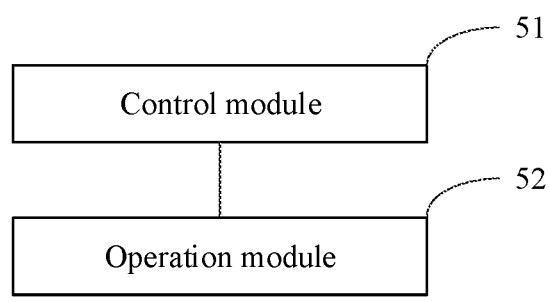
FIG. 7 is a block diagram of a parallel execution device according to an example of the present disclosure.

FIG. 7 is a block diagram of a parallel execution device according to an example of the present disclosure. The device is applied to the second processor, and may include:

a control module 51 configured to receive a program to be executed and a data parallel parameter from the first processor, where the data parallel parameter includes the degree of data parallelism.

The control module 51 is further configured to obtain data according to the degree of data parallelism, where the data is input data of the program to be executed.

The device further includes an operation module 52 configured to execute the program to be executed to process the data.

By passing a parallel degree parameter through a command line, a degree of model parallelism and a degree of data parallelism of the second processor may be adjusted and set according to a requirement for throughput and latency of a task to be processed, so as to achieve the best balance between high throughput and low latency. For different models, it is easy to reach user-desired best balance between throughput and latency. Therefore, the parallel execution method and device have strong universality and flexibility. Moreover, computing power of multiple cores in the second processor can be effectively used.

In an example, the control module 51 may include a receiving unit configured to receive the fourth command sent by the first processor, and a data parallel parameter is included in the fourth command.

Figure 8:
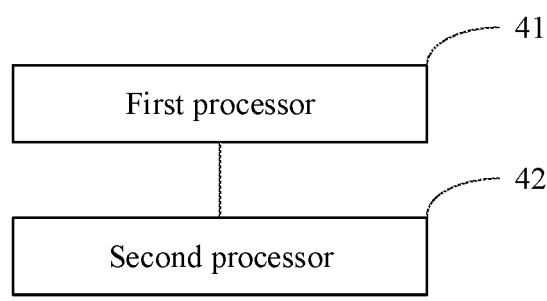
FIG. 8 is a block diagram of an artificial intelligence processing device according to an example of the present disclosure.

FIG. 8 is a block diagram of an artificial intelligence processing device according to an example of the present disclosure. As shown in FIG. 8, the device includes a first processor 41 and a second processor 42, where the first processor 41 is connected to the second processor 42, The first processor 41 is configured to perform the methods described from FIG. 1 to FIG. 3, and the second processor 42 is configured to execute the method described in the FIG. 4.

In an example, the first processor 41 may be a primary processor, and may be a general-purpose processor such as a central processing unit (CPU), a graphics processing unit (GPU), and the like. The first processor 41 may be configured to obtain input data and an artificial intelligence operator to be used, and transfer the input data and the artificial intelligence operator to be used to the second processor 42, so that the second processor 42 can execute a corresponding artificial intelligence operation. A specific type of the first processor is not limited in the present disclosure.

The second processor 42 may be an artificial intelligence processor (IPU) for performing an artificial intelligence operation, and may include multiple cores. The artificial intelligence processor may include one or more of Majority Logic Unit (MLU), Neural-Network Processing Unit (NPU), Digital Signal Process (DSP), and Field-Programmable Array Gate Array (FPGA) chip. A specific type of the second processor is not limited in the present disclosure.

In an example, the artificial intelligence processing device may be composed of different processors (such as IPU+CPU) or multiple identical processors. For instance, the multiple identical processors (XPU) may form an architecture similar to the first processor 41 and the second processor 42. Furthermore, the type of processors may be existing processors or newly proposed new processors, which is not limited in the present disclosure.

Figure 9:
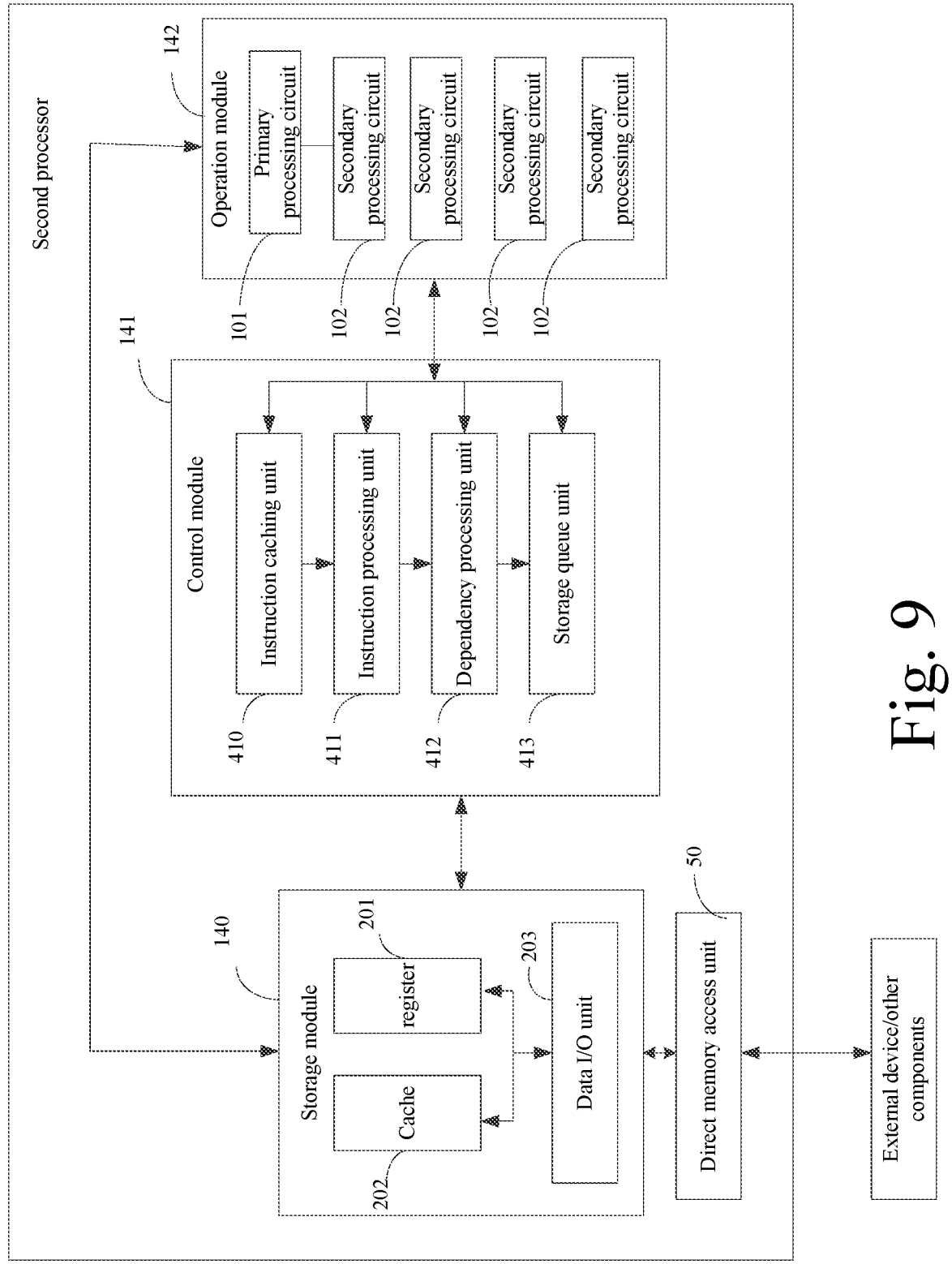
FIG. 9 is a block diagram of a second processor according to an exemplary example.

FIG. 9 is a block diagram of a second processor according to an exemplary example.

Referring to FIG. 9, the second processor is configured to perform a machine learning computation. The second processor includes: a control module 141 and an operation module 142, where the control module 141 is connected to the operation module 142, the operation module 142 includes: a primary process circuit and multiple secondary processing circuits; and the control module 141 is configured to obtain input data and a computation instruction, where the computation instruction obtained by the control module 141 may be an instruction of a program to be executed obtained after the first processor compiles a task to be processed, and the input data may be the input data of the task to be processed as described above, and may also include related parameters.

In an alternative example, the primary processing circuit and multiple secondary processing circuits may be in a tree structure, an H-type structure, or a pulse array machine structure. A connection manner among the primary processing circuit and the secondary processing circuits is not limited in the present disclosure In an alternative example, the input data and the computation instruction may be obtained through a data input/output unit, where the data input/output unit may be one or a plurality of data I/O interfaces or I/O pins.

The computation instruction includes, but is not limited to, a forward operation instruction, a backward training instruction, or other neural network operation instructions such as a convolution operation instruction. A specific expression of the computation instruction is not limited in the present disclosure.

The control module 141 is further configured to parse the computation instruction to obtain multiple operation instructions, and send the multiple operation instructions and the input data to the primary processing circuit.

A primary processing circuit 101 is configured to perform pre-processing on the input data, and transfer data and operation instructions among the multiple processing circuits.

Multiple secondary processing circuits 102 are configured to perform intermediate operations in parallel according to the data and the operation instructions transferred from the primary processing circuit to obtain multiple intermediate results, and transfer the multiple intermediate results to the primary processing circuit.

The primary processing circuit 101 is configured to perform subsequent processing on the multiple intermediate results to obtain a computing result of the computation instruction.

The technical solution provided in the present disclosure sets the operation module into a one-master and multi-slave structure. For a computation instruction of a forward operation, the operation module may split data according to the computation instruction of a forward operation, so that multiple secondary processing circuits can perform parallel computations on a part with a large amount of computations, which may increase operating speed, save operating time, and further reduce power consumption.

In an example, the machine learning computation may include an artificial neural network operation. The input data may include input neuron data and weight data. The computing result may include a result of the artificial neural network operation, which is output neuron data A neural network operation may be an operation of one layer of a neural network. For a multi-layer neural network, the implementation process may be executed as follows: in the forward operation, if the forward operation of a previous layer of the artificial neural network is completed, operating the output neuron processed in the operation unit as the input neuron of the next layer according to an operation instruction of a next layer (or performing some operations on the output neuron, and then operating the output neuron as the input neuron of the next layer), and at the same time, replacing the weight by the weight of the next layer; and in the backward operation, if the backward operation of a previous layer of the artificial neural network is completed, operating an input neuron gradient processed in the operation unit as an output neuron gradient of the next layer according to an operation instruction of a next layer (or performing some operations on the input neuron gradient, and then operating the input neuron gradient as the output neuron gradient of the next layer), and at the same time, replacing the weight replaced by the weight of the next layer.

The machine learning computation may further include a support vector machine operation, a k-nn operation, a k-means operation, a principal component analysis operation, and the like. For the convenience of description, the artificial neural network operation is used as an example to illustrate specific schemes of a machine learning computation.

For an artificial neural network operation, if the artificial neural network operation has a multi-layer operation, an input neuron and an output neuron of the multi-layer operation do not refer to a neuron in an input layer or a neuron in an output layer of the entire neural network, but refer to that for any two adjacent layers in the network, the neuron in a lower layer of the network forward operation is the input neuron and the neuron in an upper layer of the network forward operation is the output neuron. Taking a convolutional neural network as an example, given that a convolutional neural network has L layers, and K=1, 2, . . . , L−1, a $K^{th}$ layer is named as an input layer and the neuron in this layer is the input neuron. A $K+1^{th}$ layer is named as an output layer and the neuron in this layer is the output neuron. In other words, except a top layer, each layer can be used as an input layer, and the next layer is the corresponding output layer.

In an example, the second processor may further include a storage unit 140 and a direct memory access (DMA) unit 50, where the storage unit 140 may include one or more of a register and a cache. Specifically, the cache may be configured to store the computation instruction, and the register may be configured to store the input data and a scalar. The cache may be a scratch pad cache. The DMA unit 50 may be configured to read or store data from the storage unit 140.

Alternatively, the control module may include an instruction storing unit 410, an instruction processing unit 411, and a storage queue unit 413; where the instruction storing unit 410 may be configured to store the computation instruction associated with the artificial neural network operation;

the instruction processing unit 411 may be configured to parse the computation instruction to obtain multiple operation instructions; and the storage queue unit 413 may be configured to store an instruction queue, where the instruction queue may include the multiple operation instructions or the computation instruction to be executed in a sequence.

For example, in an optional technical solution, the primary processing circuit may also include a control module, where the control module may include a primary instruction processing unit for decoding an instruction into a microinstruction. In another example, the secondary processing circuit may further include another control module. The control module may also include a secondary instruction processing unit for receiving and processing the microinstruction. The microinstruction may be obtained by splitting or decoding the instruction, and may be further decoded into control signals of each component, each unit, or each processing circuit.

In an example, the structure of the computation instruction may be shown as in a table below.

| Opcode | Register or Immediate | Register/Immediate data | ... |

An ellipsis in the above table indicates that multiple registers or immediate data may be included.

In another alternative technical solution, the computation instruction may include one or more opcode fields and one opcode. The computation instruction may include a neural network operation instruction. Taking the neural network operation instruction as an example, as illustrated in the table below, a register number 0, a register number 1, a register number 2, a register number 3, and a register number 4 may be opcode fields. Each of the register number 0, the register number 1, the register number 2, the register number 3, and register number 4 may correspond to one or more registers.

| Opcode | Register number 0 | Register number 1 | Register number 2 | Register number 3 | Register number 4 |
|---|---|---|---|---|---|
| COMPUTE | Starting address of the input data | Length of the input data | Starting address of the weight | Length of the weight | Address of activation function interpolation table |

-continued

| Opcode | Register number 0 | Register number 1 | Register number 2 | Register number 3 | Register number 4 |
|---|---|---|---|---|---|
| IO | Address of external data memory | Data length | Address of internal data memory | | |
| NOP | | | | | |
| JUMP | Destination address | | | | |
| MOVE | Input address | Data size | Output address | | |

The above registers may be off-chip memories. In practical applications, the above registers may also be on-chip memories for storing data. The data may be n-dimensional data, where n is an integer greater than or equal to one. For example, if n=1, the data is one-dimensional data (a vector); if n=2, the data is two-dimensional data (a matrix); and if n=3 or above, the data is a multi-dimensional tensor.

In an example, the control module may further include a dependency relationship processing unit 412. If multiple operation instructions are provided, the dependency relationship processing unit 412 may be configured to determine whether there exists an associated relationship between a first operation instruction and a zeroth operation instruction before the first operation instruction. If there exists an associated relationship between the first operation instruction and the zeroth operation instruction, the dependency relationship processing unit 412 caches the first operation instruction in the instruction storage unit, and extracts the first operation instruction from the instruction storage unit to the operation module after the zeroth operation instruction is executed.

The determining whether there exists an associated relationship between the first operation instruction and the zeroth operation instruction before the first operation instruction includes:

extracting a first storage address range of data required (such as a matrix) in the first operation instruction according to the first operation instruction, extracting a zeroth storage address range of matrix required in the zeroth operation instruction according to the zeroth operation instruction, determining that there exists an associated relationship between the first operation instruction and the zeroth operation instruction if an overlap exists between the first storage address range and the zeroth storage address range, and determining that there does not exist an associated relationship between the first operation instruction and the zeroth operation instruction if no overlap exists between the first storage address range and the zeroth storage address range.

Examples of the present disclosure have been described above. The above descriptions are only an incomplete, not exhaustive, list of examples, and are not limited to the disclosed examples. For those of ordinary skill in the art, modifications or variations are obvious. The terms used in the present disclosure are chosen to best explain principles and practical applications of the examples, or technical improvements to the prior art, or to enable others of ordinary skills in the art to understand the examples disclosed herein.

What is claimed is:

1. A parallel execution method for a neural network, comprising:
   receiving, by a first processor, a first command and obtaining a parallel degree parameter in the first command, wherein the parallel degree parameter comprises both a model parallel parameter and a data parallel parameter, and
   setting, by the first processor, a degree of parallelism of a second processor according to the parallel degree parameter according to the first command, wherein the degree of parallelism includes a degree of model parallelism and a degree of data parallelism, so that multiple cores in the second processor perform a task to be processed by using the degree of parallelism,
   wherein the degree of model parallelism indicates how many cores of the second processor are configured to parallelly perform operations corresponding to respective layers of the neural network,
   wherein the degree of data parallelism indicates how many cores of the second processor are configured to parallelly process different portions of input data of the neural network,
   wherein the task to be processed includes an online task, wherein the setting the degree of parallelism of the second processor according to the parallel degree parameter includes:
   setting the degree of model parallelism in a first configuration file of the task to be processed according to the model parallel parameter, and
   setting the degree of data parallelism in a second configuration file of the task to be processed according to the data parallel parameter,
   wherein the first configuration file and the second configuration file are stored in the first processor,
   compiling the online task according to the degree of model parallelism in the first configuration file, and generating a program to be executed on the second processor, and
   transferring the degree of data parallelism in the second configuration file to the second processor through a second command, so that the second processor obtains data according to the degree of data parallelism and executes the program to be executed to process the data.

2. The method of claim 1, wherein the task to be processed includes an offline task, wherein the setting the degree of parallelism of the second processor according to the parallel degree parameter so as to make the multiple cores in the second processor perform the task to be processed by using the degree of parallelism further includes:
   determining the degree of model parallelism and the degree of data parallelism according to the model parallel parameter and the data parallel parameter respectively,
   compiling the offline task according to the degree of model parallelism to generate an offline file, and
   transferring data and the degree of data parallelism in the offline file to the second processor by using a third command, so that the second processor acquires data according to the degree of data parallelism and executes the program to be executed in the offline file to process the data.

3. The method of claim 1, wherein the first processor is a general purpose processor, and the second processor is an artificial intelligence processor.

4. A parallel execution device for a neural network, comprising:
 a first processor that includes:
  an obtaining circuit configured to receive, a first command and obtain a parallel degree parameter in the first command, wherein the parallel degree parameter comprises both a model parallel parameter and a data parallel parameter, and
  a setting circuit configured to set a degree of parallelism of a second processor according to the parallel degree parameter according to the first command, wherein the degree of parallelism includes a degree of model parallelism and a degree of data parallelism, so that multiple cores in the second processor perform a task to be processed by using the degree of parallelism,
  wherein the degree of model parallelism indicates how many cores of the second processor are configured to parallelly perform operations corresponding to respective layers of the neural network,
  wherein the degree of data parallelism indicates how many cores of the second processor are configured to parallelly process different portions of input data of the neural network,
  wherein the task to be processed includes an online task, and the setting circuit includes:
  a first setting circuit configured to set the degree of model parallelism in a first configuration file of the task to be processed according to the model parallel parameter, and
  a second setting circuit configured to set the degree of data parallelism in a second configuration file of the task to be processed according to the data parallel parameter,
  wherein the first configuration file and the second configuration file are stored in the first processor,
  a first compiling circuit configured to compile the online task according to the degree of model parallelism in the first configuration file, and generating a program to be executed on the second processor, and
  a first sending circuit configured to send, by using a second command, the degree of data parallelism in the second configuration file to the second processor, so that the second processor obtains data according to the degree of data parallelism and executes the program to be executed to process the data.

5. The device of claim 4, wherein the task to be processed includes an offline task, and the setting circuit further includes:
 a determining circuit configured to determine the degree of model parallelism and the degree of data parallelism according to the model parallel parameter and the data parallel parameter respectively,
 a second compiling circuit configured to compile the offline task according to the degree of model parallelism, and generate an offline file, and
 a second sending circuit configured to send, by using a third command, data and the degree of data parallelism in the offline file to the second processor, so that the second processor obtains data according to the degree of data parallelism and executes the program to be executed in the offline file to process the data.

6. The device of claim 4, wherein the first processor is a general purpose processor, and the second processor is an artificial intelligence processor.

\* \* \* \* \*